(12) United States Patent
Itoh

(10) Patent No.: US 12,194,989 B2
(45) Date of Patent: Jan. 14, 2025

(54) TRAVEL ASSISTANCE DEVICE, TRAVEL ASSISTANCE METHOD, AND NON-TRANSITORY COMPUTER READABLE MEDIUM

(71) Applicant: DENSO CORPORATION, Kariya (JP)

(72) Inventor: Akira Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 17/819,559

(22) Filed: Aug. 12, 2022

(65) Prior Publication Data

US 2022/0379884 A1 Dec. 1, 2022

Related U.S. Application Data

(63) Continuation of application No. PCT/JP2020/047954, filed on Dec. 22, 2020.

(30) Foreign Application Priority Data

Feb. 21, 2020 (JP) ................................. 2020-028410

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 40/04* (2013.01);
(Continued)

(58) Field of Classification Search
CPC ............. B60W 30/09; B60W 30/0956; B60W 40/04; B60W 50/0097; B60W 2554/4044;
(Continued)

(56) References Cited

U.S. PATENT DOCUMENTS 10,186,150 B2 * 1/2019 Aoki ................. B60W 50/0097
10,540,896 B2 * 1/2020 Kitano ................... G05D 1/024
(Continued)

FOREIGN PATENT DOCUMENTS

JP 2009-116790 A 5/2009
JP 2009-199532 A 9/2009
(Continued)

*Primary Examiner* — Abdalla A Khaled
(74) *Attorney, Agent, or Firm* — Maschoff Brennan

(57) ABSTRACT

A travel assistance device includes: an inner area prediction unit predicting a with-vehicle interaction that is a behavior taken, in response to a state of the subject vehicle, by a moving object within an inner area around the subject vehicle; an outer area prediction unit predicting a with-environment interaction that is a behavior taken by a moving object according to surrounding environment of the moving object within an outer area further to the subject vehicle than the inner area; an outer area planning unit planning a future behavior of the subject vehicle based on the predicted with-environment interaction, wherein the future behavior is a behavior pattern of the subject vehicle realized by traveling control; and an inner area planning unit planning a future trajectory of the subject vehicle in accordance with the future behavior based on the predicted with-vehicle interaction.

18 Claims, 10 Drawing Sheets

(51) Int. Cl.
*B60W 40/04* (2006.01)
*B60W 50/00* (2006.01)

(52) U.S. Cl.
CPC ............... *B60W 50/0097* (2013.01); *B60W 2554/4044* (2020.02); *B60W 2554/4046* (2020.02); *B60W 2555/60* (2020.02)

(58) Field of Classification Search
CPC ..... B60W 2554/4046; B60W 2555/60; B60W 2554/4029; G08G 1/09; G08G 1/16
See application file for complete search history.

(56) References Cited

U.S. PATENT DOCUMENTS

| | | | |
|---|---|---|---|
| 10,796,574 B2* | 10/2020 | Mishina | G01C 21/3492 |
| 11,110,917 B2* | 9/2021 | Stimpson | B60W 30/09 |
| 11,921,519 B2* | 3/2024 | Yong | G08G 1/167 |
| 2017/0242435 A1* | 8/2017 | Nilsson | G08G 1/167 |
| 2018/0056997 A1* | 3/2018 | Ohmura | B60W 10/06 |
| 2018/0074505 A1* | 3/2018 | Lv | B60W 60/00272 |
| 2018/0233048 A1* | 8/2018 | Andersson | B60Q 9/008 |
| 2019/0172355 A1* | 6/2019 | Stock | B60W 30/14 |
| 2019/0225231 A1* | 7/2019 | Ohara | B60W 30/18154 |
| 2019/0244039 A1* | 8/2019 | Tsuchiya | G06V 20/58 |
| 2023/0120172 A1* | 4/2023 | Yoshimatsu | B60W 30/0953 701/301 |
| 2024/0034313 A1* | 2/2024 | Miyai | B60W 10/18 |

FOREIGN PATENT DOCUMENTS

| | | |
|---|---|---|
| JP | 2010-033441 A | 2/2010 |
| JP | 2019-147406 A | 9/2019 |
| JP | 2019-151261 A | 9/2019 |
| JP | 2019-151309 A | 9/2019 |
| JP | 2021-133689 A | 9/2021 |

* cited by examiner

TRAVEL ASSISTANCE DEVICE, TRAVEL ASSISTANCE METHOD, AND NON-TRANSITORY COMPUTER READABLE MEDIUM

CROSS REFERENCE TO RELATED APPLICATION

The present application is a continuation application of International Patent Application No. PCT/JP2020/047954 filed on Dec. 22, 2020, which designated the U.S. and claims the benefit of priority from Japanese Patent Application No. 2020-028410 filed on Feb. 21, 2020. The entire disclosures of all of the above applications are incorporated herein by reference.

TECHNICAL FIELD

The present disclosure relates to a vehicle driving assistance technology.

BACKGROUND ART

A well-known device for estimating operation of vehicle estimates the driving characteristics of a vehicle according to the driving environment, and predicts operation of the vehicle based on the driving characteristics.

SUMMARY

The present disclosure provides a travel assistance device for assisting driving of the vehicle, comprising:
- an inner area prediction unit that predicts interaction with the subject vehicle, which is the behavior of the moving object according to the state of the subject vehicle, with respect to the moving object around the subject vehicle;
- an outer area prediction unit that, with respect to moving object in an outer area that is further to the outside than the inner area, predicts with-environment interactions that are behaviors of the moving object that corresponds to the surrounding environment of the moving object;
- an outer area planning unit that plans future behavior of the vehicle based on the with-environment interaction; and
- an internal area planning unit that plans future trajectory of the vehicle conforming to the future behavior based on the with-vehicle interaction.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
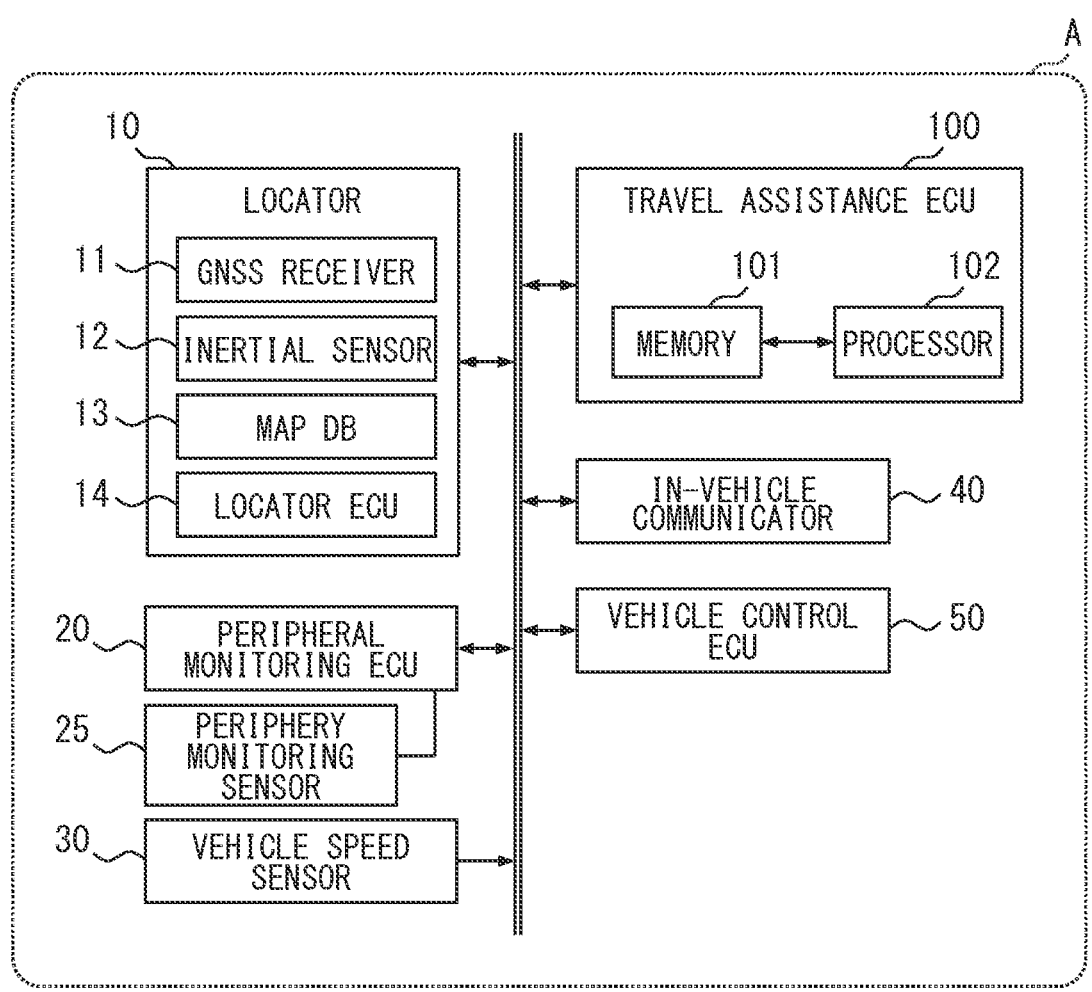
FIG. 1 is a diagram illustrating a system including a travel assist ECU.

To begin with, a relevant technology will be described first only for understanding the following embodiments. The behavior of a moving object, including another vehicle, can also be influenced by the subject vehicle, depending on the situation. The relevant technology does not describe influence to the vehicle with regard to prediction of behavior of the other vehicle. Therefore, the apparatus of the relevant technology may not be able to predict the behavior of the moving object and use result of the prediction according to the situation.

One objective of the present disclosure is to provide a travel assistance device, a travel assistance method, and a non-transitory computer readable medium storing a travel assistance program capable of predicting the behavior of the moving object based on the situation and the result of prediction.

The aspects disclosed in this specification employ different technical means to attain the respective objectives. It is to be noted that reference numerals in parentheses described in this section and the scope of the claims are examples indicating correspondences with specific means described in embodiments described later as one embodiment and do not limit the technical scope.

One of the disclosed travel assistance methods is a travel assistance method executed by a processor in order to assist travel of the subject vehicle, comprising:
- an inner area prediction process that predicts with-vehicle interaction, which is the behavior of the moving object according to the state of the subject vehicle, with respect to the moving object around the subject vehicle;
- an outer area prediction process that, with respect to moving object in an outer area that is further to the outside than the inner area, predicts with-environment interactions that are behaviors of the moving object that corresponds to the surrounding environment of the moving object;
- an outer area planning process that plans future behavior of the vehicle based on the with-environment interaction; and
- an internal area planning process that plans future trajectory of the vehicle conforming to the future behavior based on the with-vehicle interaction.

A non-transitory computer readable medium stores one of the disclosed travel assistance programs, which is a travel assistance program including instructions to be executed by a processor to assist driving of the subject vehicle, the instructions comprising:
an inner area prediction process predicting with-vehicle interaction, which is the behavior of the moving object according to the state of the subject vehicle, with respect to the moving object around the subject vehicle;
an outer area prediction process, with respect to moving object in an outer area that is further to the outside than the inner area, predicting with-environment interactions that are behaviors of the moving object that corresponds to the surrounding environment of the moving object;
an outer area planning process planning future behavior of the vehicle based on the with-environment interaction; and
an internal area planning process planning future trajectory of the vehicle conforming to the future behavior based on the with-vehicle interaction.

The present publication predicts the with-vehicle interaction, which is the behavior of the moving object according to the state of the subject vehicle, with respect to the moving object around the subject vehicle. The with-environment interaction, which is the behavior of the moving object according to the surrounding environment of the moving object with respect to the moving object in the outer area, which is an area outside the inner area, is predicted. Then, the future behavior of the subject vehicle is planned based on the with-environment interaction, and the future trajectory of the subject vehicle is planned based on the with-vehicle interaction. Therefore, prediction of behavior and use of result of the prediction can be carried out by respective situations of the moving objects that are relatively close to the subject vehicle and are likely to have greater influence on the subject vehicle, and the moving object that are relatively far away from the subject vehicle and are likely to have smaller influence on the subject vehicle. As described above, a travel assistance device, a travel assistance method, and a non-transitory computer readable medium storing a travel assistance program capable of predicting the behavior of the moving object based on the situation can be provided.

First Embodiment

A travel assistance device according to a first embodiment will be described with reference to FIGS. 1 to 13. The travel assistance device of the first embodiment is provided by the travel assistance ECU 100 which is an electronic control device mounted on a subject vehicle A. The subject vehicle A has at least one of an automatic driving function and an advanced driving assistance function. The travel assistance ECU 100 predicts the behavior of a moving object around the subject vehicle A, and assists traveling of the subject vehicle A based on result of the prediction. The travel assistance ECU 100 is connected to a locator 10, a periphery monitoring ECU 20, a vehicle speed sensor 30, an in-vehicle communicator 40, and a vehicle control ECU 50 via a communication bus or the like.

The locator 10 generates position information of the vehicle by a complex positioning method that combines multiple types and pieces of acquired information. The locator 10 includes a GNSS (Global Navigation Satellite System) receiver 11, an inertial sensor 12, and a map database (hereinafter, database DB) 13, and a locator ECU 14. The GNSS receiver 11 receives positioning signals from multiple positioning satellites. The inertial sensor 12 is a sensor that detects the inertial force acting on the subject vehicle A. The inertial sensor 12 includes, for example, a 3-axis gyro sensor and a 3-axis acceleration sensor, and detects an angular velocity and an acceleration acting on the subject vehicle A.

The map DB 13 is a nonvolatile memory, and stores map information such as link data, node data, terrain, structure and the like. The map information is, for example, a three-dimensional map consisting of a point cloud of feature points of the terrain and the structure. The three-dimensional map may be generated based on a captured image by REM (Road Experience Management). The map information may include road sign concessions, traffic regulation information, road construction information, weather information, and the like. The map information stored in the map DB 13 updates regularly or at any time based on the latest information received by the in-vehicle communicator 40

The locator ECU 14 mainly includes a microcomputer equipped with a processor, a memory, an input/output interface, and a bus connecting these elements. The locator ECU 14 combines the positioning signals received by the GNSS receiver 11, the map data of the map DB 13, and the measurement results of the inertial sensors 12 to sequentially detect the vehicle position (hereinafter, subject vehicle position) of the subject vehicle A. The vehicle position may consist of, for example, coordinates of latitude and longitude. The vehicle position may be measured using a travel distance obtained from signals sequentially output from the vehicle speed sensor 30 mounted on the subject vehicle A. When a three-dimensional map provided by a road shape and a point group of feature points of a structure is used as map data, the locator ECU 14 may specify the position of the own vehicle by using the three-dimensional map and the detection results of the periphery monitoring sensor 25 without using the GNSS receiver 11. The locator ECU 14 sequentially provides the vehicle position information, the acceleration information of the subject vehicle A, map information around the subject vehicle A, and the like to the travel assistance ECU 100.

The periphery monitoring ECU 20 is mainly configured of a microcomputer including a processor, a memory, an input/output interface, and a bus connecting these elements, and executing various control programs stored in the memory to perform various processes. The periphery monitoring ECU 20 acquires detection result from the periphery monitoring sensor 25 mounted on the subject vehicle A, and recognizes the traveling environment of the subject vehicle A based on the detection result.

The periphery monitoring sensor 25 is an autonomous sensor that monitors environment around the subject vehicle A, and includes an LiDAR (Light Detection and Ranging/Laser Imaging Detection and Ranging), which detects a point cloud of feature points of object on land, and a periphery monitoring camera, which captures images of a predetermined area including the front of the subject vehicle A. The periphery monitoring sensor 25 includes a millimeter wave radar, sonar, and the like. The periphery monitoring sensor 25 is an example of an "in-vehicle sensor".

The periphery monitoring ECU 20 can, for example, analyze and process point group images acquired from the LiDAR and images acquired from periphery monitoring cameras, etc., to recognize the presence or absence of obstacles on route of travel of the subject vehicle A and moving object around the subject vehicle A as well as the position, direction of travel, and etc. Here, the moving object around the subject vehicle A includes other vehicle such as automobiles and light vehicle, pedestrian, and the like. The periphery monitoring ECU 20 sequentially provides the above-mentioned information of obstacles, information of moving object (moving object information), and the like to the traveling assistance ECU 100.

The in-vehicle communicator 40 is a communication module mounted on the subject vehicle A. The in-vehicle communicator 40 has at least a V2N (Vehicle to cellular Network) communication function in line with communication standards such as LTE (Long Term Evolution) and 5G, and sends and receives radio waves to and from base stations around the subject vehicle A. The in-vehicle communication device 40 may further have functions such as road-to-vehicle (Vehicle to roadside Infrastructure) communication and inter-vehicle (Vehicle to Vehicle) communication. The in-vehicle communicator 40 obtains traffic information, such as traffic congestion information, accident information and traffic regulation information associated with road works, and infrastructure information on road facilities such as traffic lights and roadside cameras, from external facility such as traffic information center or roadside equipment. The in-vehicle communicator 40 enables cooperation between a cloud and in-vehicle system (Cloud to Car) by V2N communication. By installing the in-vehicle communicator 40, the subject vehicle A is able to connect to the Internet.

The vehicle control ECU 50 is an electronic control device that performs acceleration and deceleration control and steering control of the subject vehicle A. The vehicle control ECU 50 includes a steering ECU that performs steering control, a power unit control ECU and a brake ECU that perform acceleration/deceleration control, and the like. The vehicle control ECU 50 acquires detection signals output from respective sensors such as the steering angle sensor, the vehicle speed sensor, and the like mounted on the subject vehicle, and outputs a control signal to an electronic control throttle, a brake actuator, an EPS (Electronic Power Steering) motor, and the like. The vehicle control ECU 50 controls each travel control device so as to realize automatic driving or advanced driving assistance according to each plan according to a trajectory plan described later from the travel assistance ECU 100.

The travel assistance ECU 100 predicts behavior of the moving object around the subject vehicle A based on the information from each of the above-mentioned components. In addition, the traveling assistance ECU 100 generates future behavior and future trajectory of the subject vehicle A based on the predicted behavior. The traveling assistance ECU 100 mainly includes a memory 101, a processor 102, an input/output interface, a bus connecting these components, and the like. The processor 102 is a hardware for arithmetic processing. The processor 102 includes, as a core, at least one type of, for example, a CPU (Central Processing Unit), a GPU (Graphics Processing Unit), an RISC (Reduced Instruction Set Computer) CPU, and so on.

The memory 101 is at least one type of non-transitory tangible storage medium, such as a semiconductor memory, a magnetic storage medium, and an optical storage medium, for non-transitory storing or memorizing computer readable programs and data. The memory 101 stores various programs executed by the processor 102, such as a travel assistance program described later.

Figure 2:
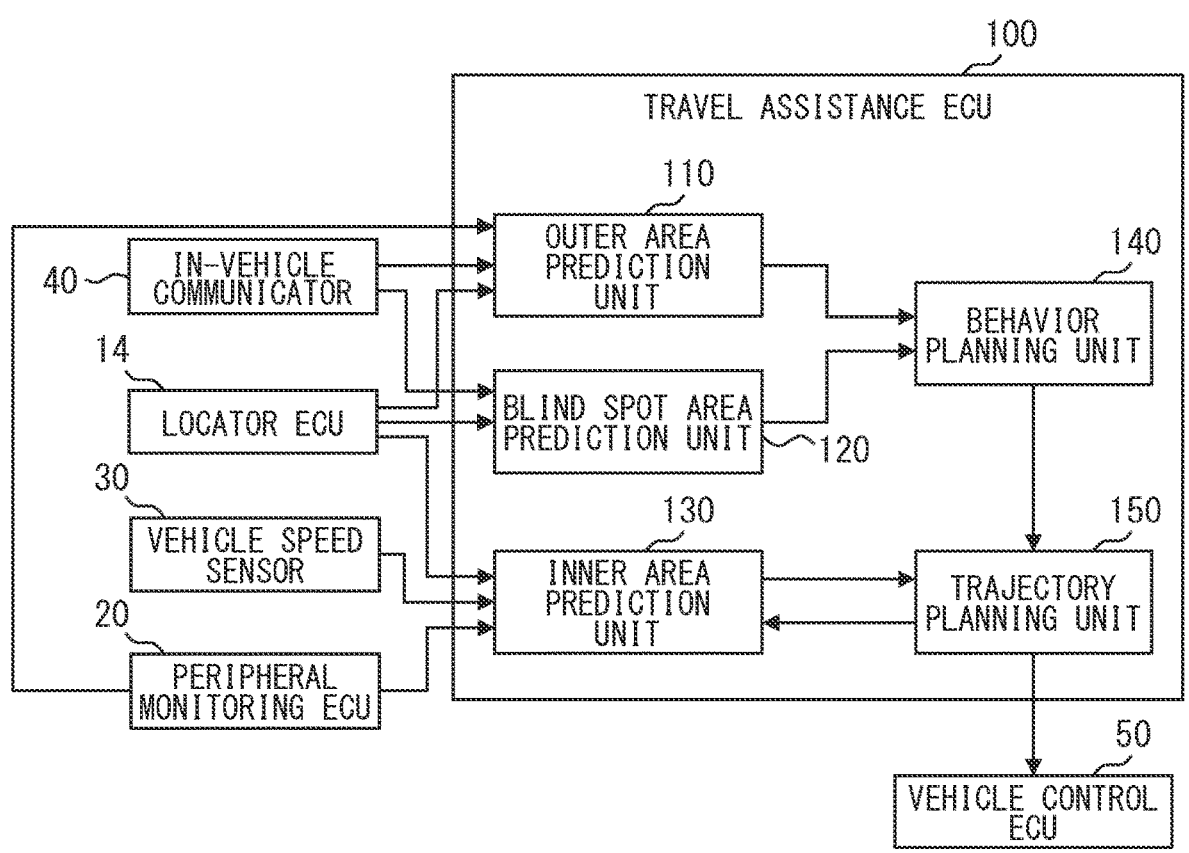
FIG. 2 is a block diagram illustrating functions included in the travel assist ECU.

The processor 102 executes a plurality of instructions included in the travel assistance program stored in the memory 101. As a result, the travel assistance ECU 100 predicts the behavior of the moving object around the subject vehicle, and constructs a plurality of functional units for assisting the travel of the subject vehicle based on the predicted behavior. As described above, in the travel assistance ECU 100, the program stored in the memory 101 causes the processor 102 to execute a plurality of instructions, thereby constructing a plurality of functional units. Specifically, as shown in FIG. 2, the travel assistance ECU 100 includes functional units such as an outer area prediction unit 110, a blind spot area prediction unit 120, an inner area prediction unit 130, an behavior planning unit 140, and a trajectory planning unit 150. The outer area prediction unit 110 predicts the with-environment interaction, which is the behavior of the moving object according to the surrounding environment of the moving object, with respect to the moving object in the outer area, which is an area outside the inner area described later. The outer area prediction unit 110 acquires surrounding environment information regarding the surrounding of the moving object via an in-vehicle device such as an in-vehicle communicator 40, a locator ECU 14, and a periphery monitoring ECU 20 for predicting the with-environment interaction. The surrounding environment information includes, for example, infrastructure information, traffic information, map information, information on other moving object around the moving object to be predicted, and the like. The outer area prediction unit 110 combines the moving object information about the moving object to be predicted and the surrounding environment information and uses such information for predicting the with-environment interaction.

The with-environment interaction includes, for example, progress or stop of the moving object according to state of traffic light. The with-environment interaction includes stopping, decelerating, changing lanes of other vehicles in response to traffic congestion, construction work, accident occurrence, and the like. The with-environment interaction includes changing speed, stopping, changing direction, and the like of the predicted moving object according to the behavior of another moving object around the predicted moving object. The outer area prediction unit 110 sequentially provides the prediction result of the with-environment interaction to the behavior planning unit 140.

The blind spot area prediction unit 120 predicts the behavior of the moving object based on the blind spot moving object information regarding the moving object in the blind spot area of the subject vehicle A. Here, the blind spot area is an area outside the detection range of the periphery monitoring sensor 25 mounted on the subject vehicle A, or an area where the detection accuracy deteriorates. The blind spot area is determined based on the map information, the vehicle position information, and the like.

The blind spot area prediction unit 120 acquires the blind spot moving object information based on, for example, data taken by a roadside camera. The blind spot moving object information includes at least information regarding moving direction of the moving object. The blind spot moving body information includes information such as position, speed, and acceleration of the moving object. The blind spot area prediction unit 120 acquires blind spot moving object information based on detection data of a roadside sensor other than the roadside camera. Alternatively, the blind spot area prediction unit 120 may acquire blind spot moving object information from another vehicle in the blind spot area or another vehicle around the blind spot area by vehicle-to-vehicle communication.

Based on the blind spot moving object information, the blind spot area prediction unit 120 predicts whether or not the moving object is approaching the subject vehicle A. The blind spot area prediction unit 120 predicts more detailed behavior such as future behavior and future trajectory of the moving object. The blind spot area prediction unit 120 sequentially provides the prediction result to the behavior planning unit 140.

The blind spot area prediction unit 120 predicts the existence of an undetected moving object. For example, the blind spot area prediction unit 120 predicts the existence of the undetected moving object when there is no blind spot moving object information and at the same time there is blind spot area where it is difficult to determine when the moving object exists. The blind spot area prediction unit 120 sequentially provides the determination result of existence to the behavior planning unit 140. The blind spot area prediction unit 120 is an example of a "possibility determination unit".

The inner area prediction unit 130 predicts the with-vehicle interaction, which is the behavior of the moving object according to the state of the subject vehicle A, with respect to the moving object around the subject vehicle A. The inner area is an area including the position of the subject vehicle A, and inside the outer area. That is, the outer area has an edge further from the subject vehicle A than the outer edge of the inner area. The inner area prediction unit 130 acquires the subject vehicle information regarding the state of the subject vehicle A via the locator ECU 14 and the vehicle speed sensor 30 for predicting the with-vehicle interaction. The vehicle information includes, for example, the vehicle position, speed, traveling direction, posture, acceleration, and the like. The subject vehicle information includes behavior plan, trajectory plan, and the like of the subject vehicle A. The inner area prediction unit 130 acquires the moving object information regarding the state of the moving object via the periphery monitoring ECU 20 or the like for predicting the with-vehicle interaction. The moving object information includes, for example, position, speed, traveling direction, posture, acceleration, and the like of the moving object. The inner area prediction unit 130 combines the subject vehicle information and the moving object information and uses such information for predicting the with-vehicle interaction.

The with-vehicle interaction includes, for example, yielding operation of the other vehicle in response to passing by the subject vehicle A on a narrow road, and speed adjustment of the other vehicle at the lane change destination in response to the lane change of the subject vehicle A. The inner area prediction unit 130 sequentially provides the prediction result of the with-vehicle interaction to the trajectory planning unit 150.

The behavior planning unit 140 generates a future behavior to be executed by the subject vehicle A in the future based on the with-environment interaction from the outer area prediction unit 110 and the prediction result from the blind spot area prediction unit 120. The future behavior is a behavior pattern of the subject vehicle A that is realized by traveling control on the traveling route, and defines a range in which the future trajectory can be taken, which will be described later. The future behavior includes going straight, turning left and right, stopping, changing lanes, and driving slowly. For example, the behavior planning unit 140 plans the future behavior such as stopping or slowing down when the other vehicle hinders the progress of the subject vehicle A. Alternatively, the behavior planning unit 140 plans the future behavior in preparation for appearance of other vehicles such as driving, based on the possibility that another vehicle that are undetected. The behavior planning unit 140 is an example of the "outer area planning unit".

The trajectory planning unit 150 generates a future trajectory to be followed by the subject vehicle A according to the behavior prediction result from the inner area prediction unit 130. The future trajectory is a planned travel trajectory defining traveling positions of the subject vehicle A in accordance with travelling of the subject vehicle A following the planned future behavior. The future trajectory defines the speed of the subject vehicle A at each traveling position. The trajectory planning unit 150 sequentially outputs generated trajectory plans to the vehicle control ECU 50. The trajectory planning unit 150 is an example of the "inner area planning unit".

Figure 3:
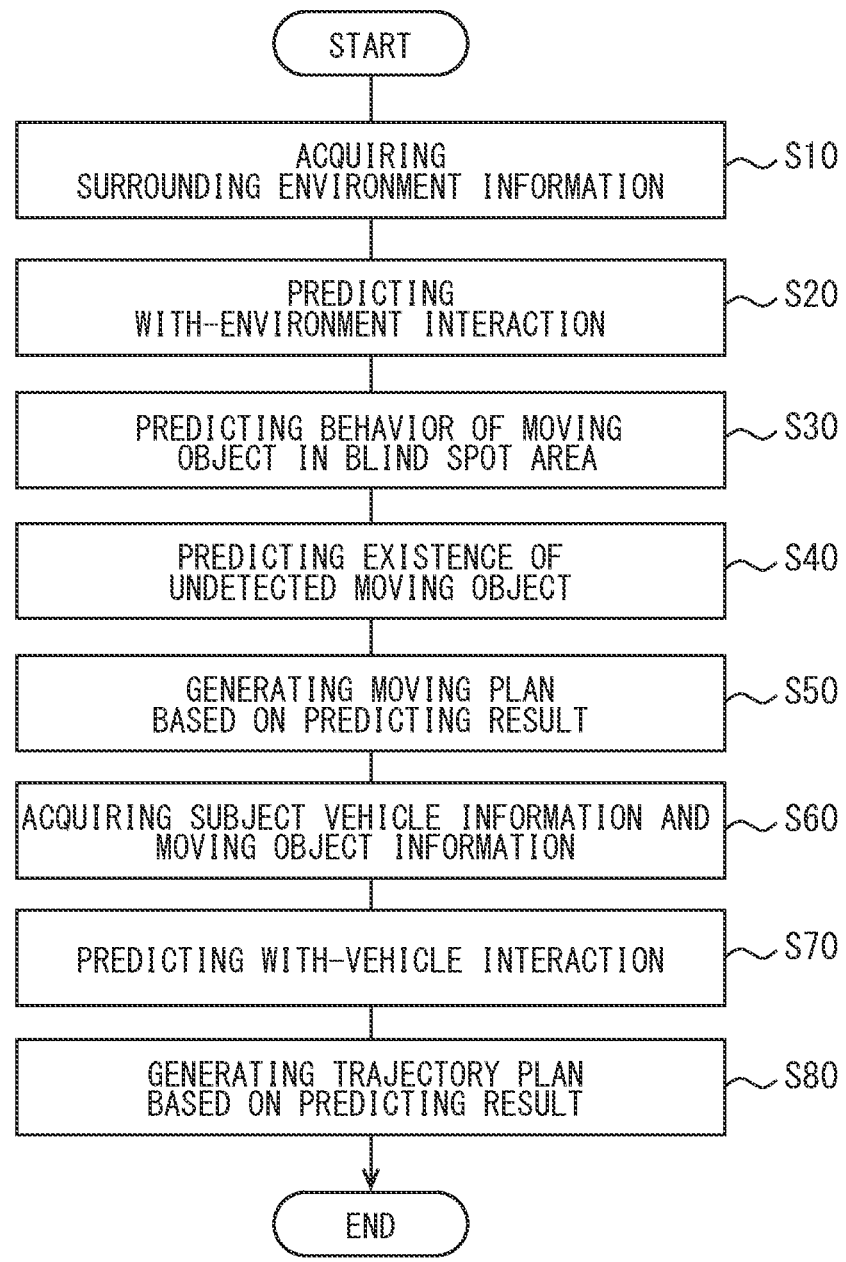
FIG. 3 is a flowchart illustrating the driving assistance method performed by the travel assist ECU.

Next, the flow of the travel assistance method realized by the travel assistance ECU 100 executing the travel assistance program will be described below with reference to FIGS. 2-3. In a flowchart to be described later, "S" means multiple steps of the flowchart to be executed by multiple instructions included in the program.

Firstly, in step S10, the outer area prediction unit 110 acquires surrounding environment information. Next, in step S20, the outer area prediction unit 110 predicts the with-environment interaction based on the surrounding environment information. Then, in step S30, the blind spot area prediction unit 120 predicts the behavior of the moving objects in the blind spot area based on the blind spot moving object information. At the time there is no blind spot moving object information, step S30 may be omitted.

Next, in step S40, the blind spot area prediction unit 120 predicts the possibility of existence of the undetected moving object. Then, in step S50, the behavior planning unit 140 plans the future behavior of the subject vehicle A based on the prediction results in steps S20, S30, and S40.

Next, in step S60, the subject vehicle information and the moving object information are acquired. In the following step S70, the with-vehicle interaction is predicted based on the vehicle information and the moving object information. Then, in step S80, the trajectory planning unit 150 generates a trajectory plan for the future trajectory based on the prediction result and the behavior plan of the with-vehicle interaction. The generated trajectory plan is output to the vehicle control ECU 50, and a series of processes is completed. The travel support ECU 100 repeatedly executes the above series of processes while the subject vehicle A is traveling, and sequentially implements the travel assistance of the subject vehicle A according to the behavior of the moving objects in the vicinity.

The above-mentioned step S20 is an example of the "outer area prediction process", step S30 is an example of the "blind spot area prediction process", step S40 is an example of the "possibility determination process", step S50 is an example of the "outer area planning process", step S70 is an example of the "inner area prediction process", and step S80 is an example of the "inner area planning process".

Next, an example of travel assistance in a specific driving scene will be described with reference to FIGS. 4 to 13. Firstly, behavior prediction of the moving object in the inner area and associated trajectory plan will be described.

Figure 4:
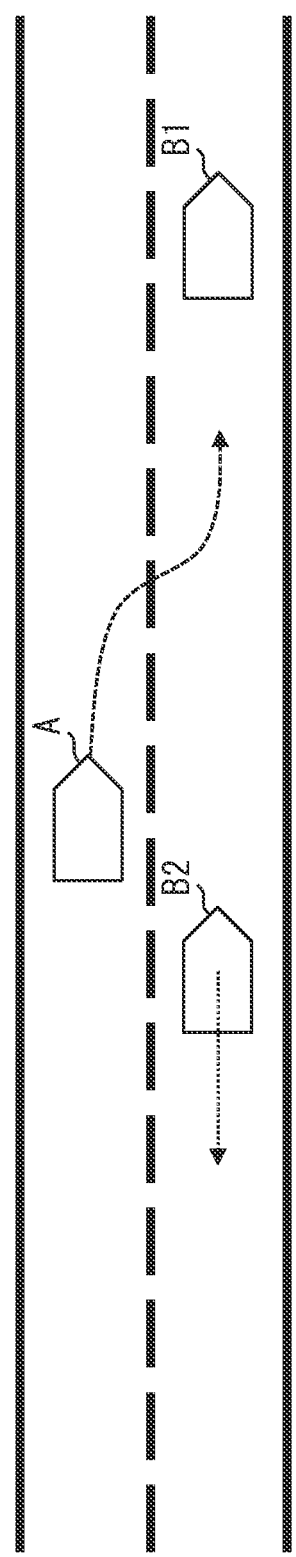
FIG. 4 is a diagram illustrating an example of prediction of with-vehicle interaction.

FIG. 4 shows a lane change scene of the subject vehicle A. In this scene, other vehicles B1 and B2, which are moving objects, travel in a lane which is a target lane that the subject vehicle A is going to be changed (the lane to be changed). The subject vehicle A will perform a lane change by cutting in into a space between the other vehicle B1 and vehicle B2.

In this scene, the inner area prediction unit 130 predicts the reaction of the other vehicle B2 to the interruption caused by the subject vehicle A as with-vehicle interaction. Specifically, the inner area prediction unit 130 predicts the deceleration of the other vehicle B2 in response to the interruption by the subject vehicle A. The deceleration due to the interruption of the subject vehicle A is a deceleration that is expected from a yielding action that will be taken by the following vehicle assuming that the following vehicle yields to the subject vehicle A cutting in into a front space of the following vehicle and keeps a distance to the subject vehicle A.

The trajectory planning unit 150 plans the future trajectory of the subject vehicle A to perform a lane change based on the deceleration of the other vehicle B2 predicted by the inner area prediction unit 130. Specifically, the trajectory planning unit 150 generates the future trajectory including a lane change start time, a start position, a start speed, a completion time for the lane change, and the like of the subject vehicle A.

Figure 5:
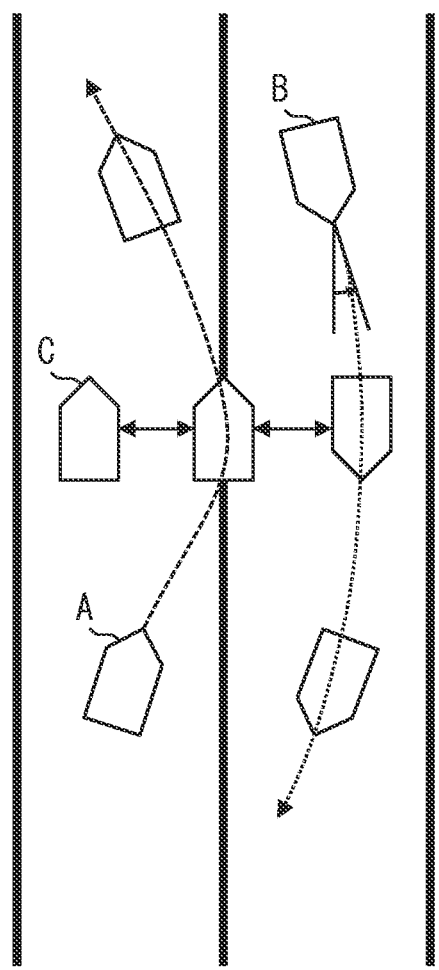
FIG. 5 is a diagram illustrating an example of prediction of with-vehicle interaction.
Figure 6:
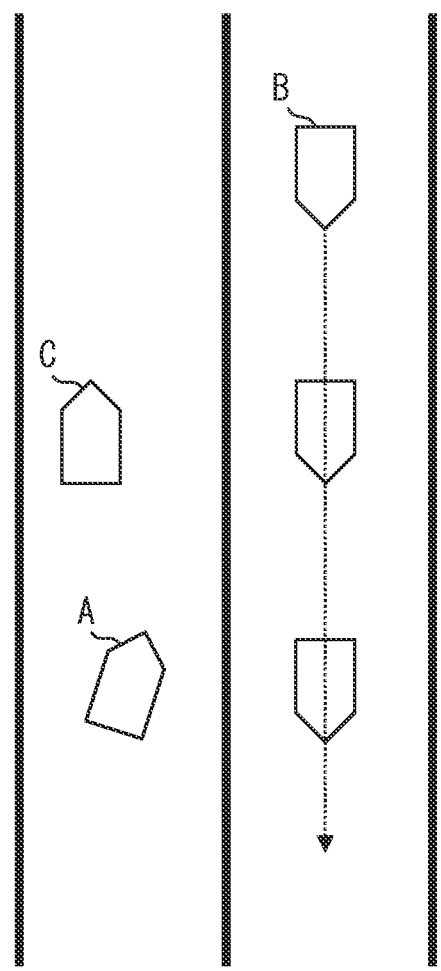
FIG. 6 is a diagram illustrating an example of prediction of with-vehicle interaction.

FIGS. 5 and 6 show a scene in which the subject vehicle A and another vehicle B, which is an oncoming vehicle, pass each other. In this passing scene, the parked vehicle C exists in the current lane of the subject vehicle A, and the other vehicle B as a moving object is traveling in the inner area in the oncoming lane adjacent to the current lane.

In this scene, the trajectory planning unit 150 generates an avoiding trajectory for avoiding the parked vehicle C on the right side (see the dot line arrow in FIG. 5). The trajectory planning unit 150 provides the generated avoiding trajectory to the inner area prediction unit 130. The inner area prediction unit 130 predicts the with-vehicle interaction by the other vehicle B in response to the subject vehicle A traveling along the avoiding trajectory. The with-vehicle interaction includes yielding driving and straight-ahead driving. As shown in FIG. 5, the yielding driving refers to driving of the other vehicle B going toward the left side in the oncoming lane (on the right side in FIG. 5) and yields the traveling space to the subject vehicle A. As shown in FIG. 6, the straight-ahead driving refers to driving of the vehicle travelling straight without yielding to the subject vehicle A.

The inner area prediction unit 130 predicts the with-vehicle interaction based on the traveling direction of the other vehicle B. Specifically, the inner area prediction unit 130 predicts the yielding driving of the other vehicle B when the yaw angle of the other vehicle B is equal to or greater than a predetermined angle with respect to the straight direction The inner area prediction unit 130 estimates the avoiding trajectory by the other vehicle B performing the yielding driving based on the speed and the traveling direction of the other vehicle B. The avoiding trajectory has, for example, an arc shape that bulges toward a shoulder side of the road. On the other hand, the inner area prediction unit 130 estimates a traveling trajectory extending from the current position of the other vehicle B in parallel with the lane when it is predicted that the other vehicle B will not yield and will travel straight. The inner area prediction unit 130 provides the prediction result of the with-vehicle interaction to the trajectory planning unit 150.

The trajectory planning unit 150 determines the avoiding trajectory along which the subject vehicle A actually travels based on the acquired with-vehicle interaction. For example, when it is predicted that the other vehicle B will yield to the subject vehicle A, the trajectory planning unit 150 generates the avoiding trajectory which would provide the subject vehicle A with predetermined distances to the other vehicle B and the parked vehicle C, and outputs the avoiding trajectory to the vehicle control ECU 50 (See FIG. 5). On the other hand, when it is predicted that the other vehicle B will travels straight, the trajectory planning unit 150 sets the stop information that causes the subject vehicle A to stop behind the parked vehicle C for the avoidance trajectory (see FIG. 6). As a result, it is possible to wait for the passage of the other vehicle B and then pass by the side of the parked vehicle C.

Figure 7:
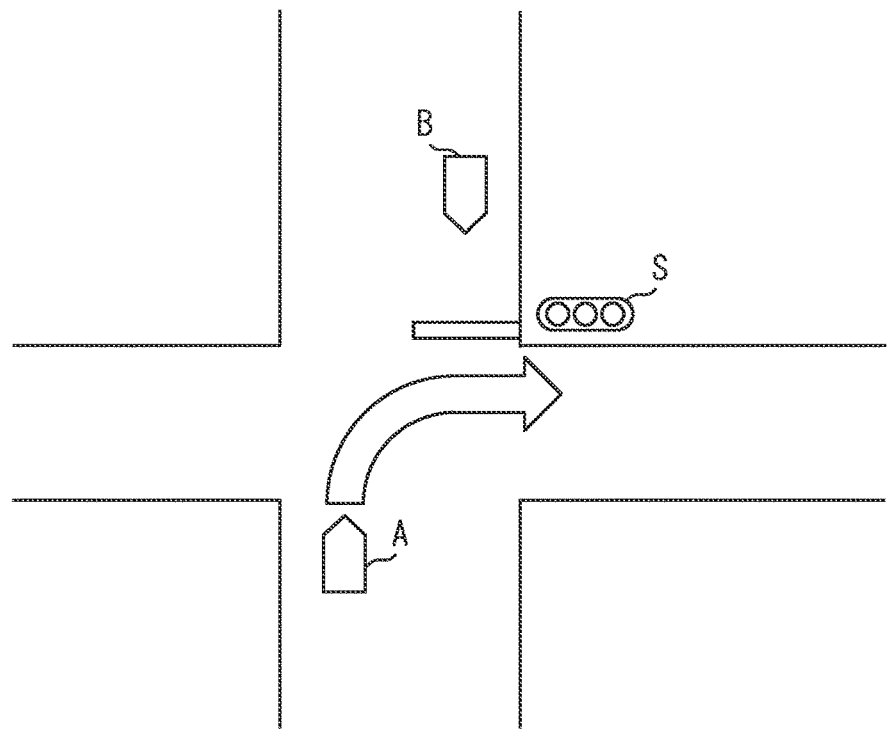
FIG. 7 is a diagram illustrating an example of prediction of with-environment interaction.

Behavior prediction of the moving object in the outer area and a trajectory plan in accordance with the behavior prediction will be described as following. FIG. 7 shows a turning right scene of the subject vehicle A at an intersection. In this turning right scene, the other vehicle B is an oncoming vehicle traveling in the oncoming lane across the intersection. A traffic light S is installed at the intersection.

In this scene, the outer area prediction unit 110 acquires moving object information including speed and position of the other vehicle B. The outer area prediction unit 110 acquires the state of the traffic light S in the outer area as infrastructure information. The state of the traffic light S includes, for example, current and future light colors, the duration of each light color, and the like. Based on the above information, the outer area prediction unit 110 predicts the with-environment interaction of the other vehicle B in response to the state of the traffic light S.

Specifically, the outer area prediction unit 110 predicts whether or not the other vehicle B will stop at the intersection. For example, when the outer area prediction unit 110 predicts that the other vehicle B will pass the intersection at the time the traffic light S is predicted to be the light color indicating "pass" when the other vehicle B approaches the intersection at its current speed. On the other hand, when the outer area prediction unit 110 predicts that the other vehicle B will stop before passing the intersection at the time the traffic light S is predicted to be the light color indicating "stop" when the other vehicle B approaches the intersection at its current speed.

The behavior planning unit 140 plans the future behavior of the subject vehicle A based on the above prediction results of the with-environment interaction. Specifically, when the other vehicle B is predicted to enter the intersection, the behavior planning unit 140 makes a plan for the subject vehicle A to stop before the intersection, and when the other vehicle B is predicted to stop before the intersection, a right turn behavior is planned for the subject vehicle A.

Figure 8:
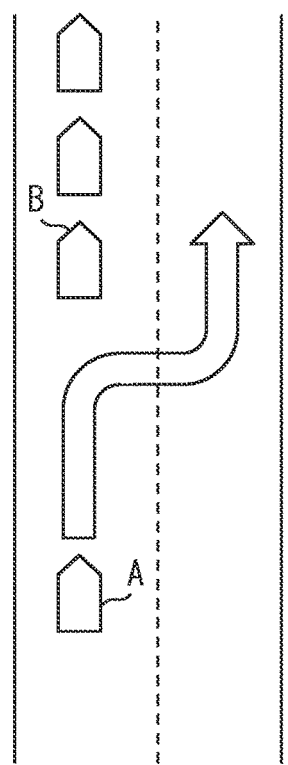
FIG. 8 is a diagram illustrating an example of prediction of with-environment interaction.

FIG. 8 shows an approach scene to a congested convoy. In this scene, the preceding vehicle B, which is a moving object, travels at a low speed or stops due to the traffic congestion.

In this scene, the outer area prediction unit 110 acquires traffic congestion information as surrounding environment information. The outer area prediction unit 110 predicts the with-environment interaction of the preceding vehicle B in response to the congestion state based on the congestion information, which is information about another vehicle different from the preceding vehicle B, and the position information of the preceding vehicle B.

Specifically, the outer area prediction unit 110 predicts whether or not the preceding vehicle B is in the traffic congestion. For example, when it is determined that the location of the preceding vehicle B is in a congestion area estimated based on the congestion information, the outer area prediction unit 110 predicts that the preceding vehicle B has been in the congestion. The behavior planning unit 140 plans the future behavior for the subject vehicle A based on the prediction results of the with-environment interaction. Specifically, when the preceding vehicle B is predicted to be in the congestion, the behavior planning unit 140 plans a lane change behavior for the subject vehicle A to direct the subject vehicle A to a lane where no traffic congestion occurs.

Figure 9:
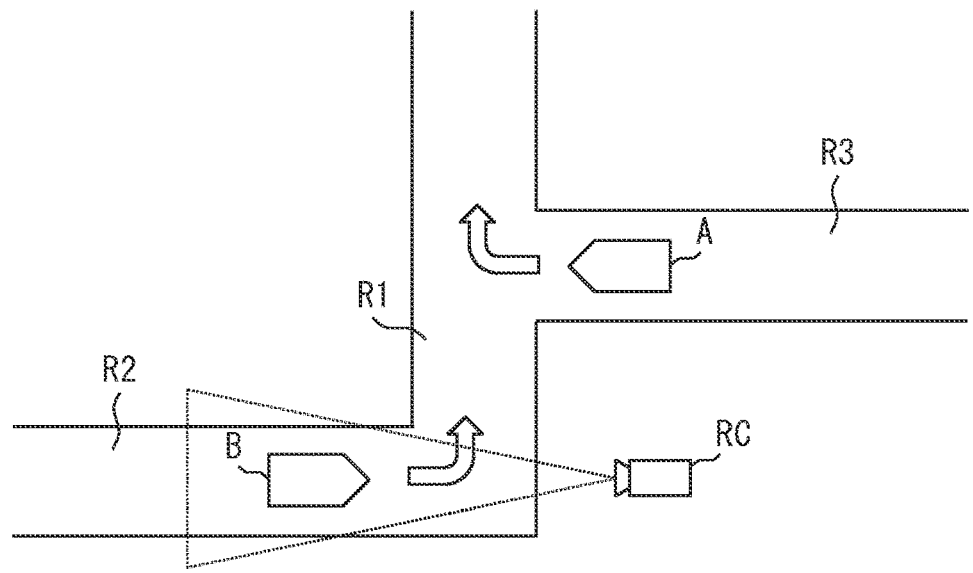
FIG. 9 is a diagram illustrating an example of behavior prediction of a moving object based on blind spot moving object information.

Behavior prediction of the other vehicle in the blind spot area and a trajectory plan in accordance with the behavior prediction will be described as following. FIG. 9 shows an approach scene of the other vehicle B from the blind spot area. The traveling terrain in this scene consists of a second road R2 and a third road R3 connected alternately to a first road R1. The other vehicle B as a moving object is traveling on the second road R2, and the subject vehicle A is traveling on the third road R3. The second road R2 is a blind spot area from the third road R3. That is, the other vehicle B traveling on the second road R2 cannot be detected by the periphery monitoring sensor 25 of the subject vehicle A traveling on the third road R3. The roadside camera RC capable of capturing an image of the second road R2 is installed on the side of the road. It is assumed that the subject vehicle A is scheduled to turn right at the intersection of the third road R3 and the first road R1.

The blind spot area prediction unit 120 acquires the detection information of the other vehicle B by the roadside camera RC. The detection information is, for example, an analysis result obtained by analyzing the image from the roadside camera RC at a center, and the detection information includes at least information regarding velocity vector of the other vehicle B. The blind spot area prediction unit 120 predicts whether or not the other vehicle B is approaching the subject vehicle A based on the direction of the velocity vector. The behavior planning unit 140 generates the behavior plan for the subject vehicle A based on the approach by the other vehicle B predicted by the blind spot area prediction unit 120. Specifically, when it is predicted that the other vehicle B is approaching, the behavior planning unit 140 makes a plan for the subject vehicle A to wait at a position before a merge point to the first road R1 until the other vehicle B passes the merge point and then to turn right after waiting. On the other hand, when it is predicted that the other vehicle B is not approaching, turning right is planned without waiting.

Figure 10:
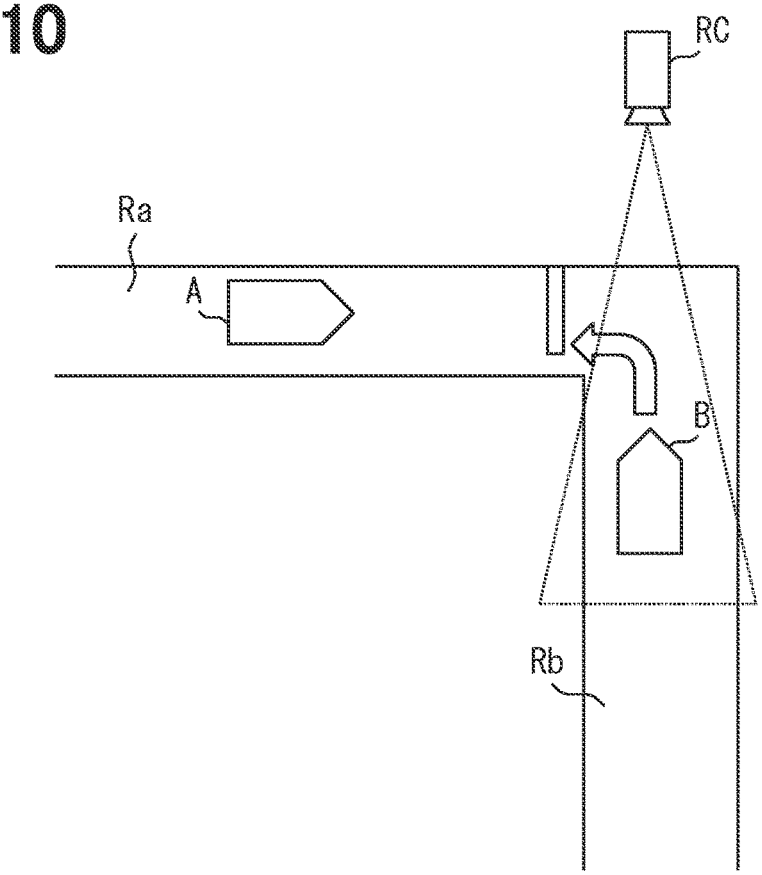
FIG. 10 is a diagram illustrating an example of behavior prediction of the moving object based on blind spot moving object information.

FIG. 10 shows a scene in which the subject vehicle A traveling on the road Ra and the other vehicle B traveling on a connecting road Rb connected to the road Ra at a right angle. In this scene, it is assumed that the connecting road Rb is the blind spot area for the subject vehicle A. The roadside camera RC having an imaging range of the connecting road Rb is installed on the side of the road. A stop line is provided near a connection portion of the road Ra with the connecting road Rb.

In this scene, the blind spot area prediction unit 120 acquires the detection information of the other vehicle B by the roadside camera RC as in the approach scene, and predicts the approaching behavior of the other vehicle B. When the other vehicle B is predicted to approach, the behavior planning unit 140 plans a stop behavior for the subject vehicle A to stop at a stop position that is further away from the stop line than when the other vehicle B is predicted not to approach The behavior planning unit 40 also plans a turning right behavior for the subject vehicle A to turn right after the other vehicle B passes the subject vehicle A. The behavior planning unit 140 may set, in the stop behavior, a stop position closer to the shoulder side of the road when the other vehicle B exists than when the other vehicle B does not exist. As a result, it is possible to stop that secures the direction of the other vehicle B.

Figure 11:
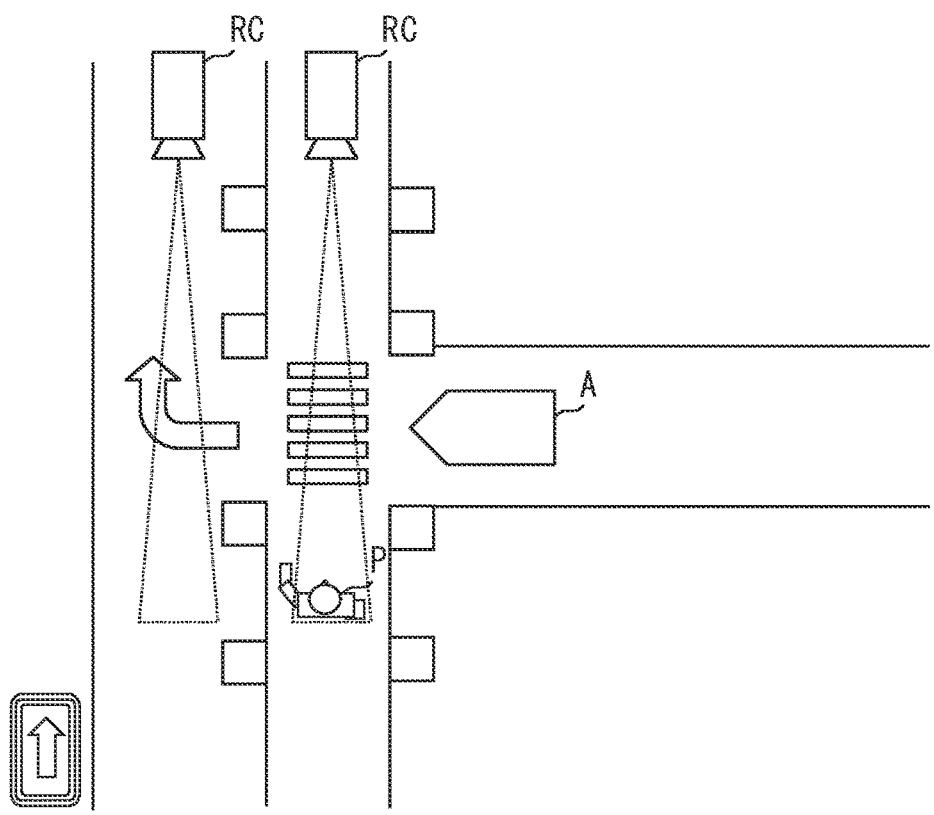
FIG. 11 is a diagram illustrating an example of behavior prediction of the moving object based on blind spot moving object information.

FIG. 11 shows a pedestrian crossing passing scene in which the subject vehicle A passes through a pedestrian crossing. In this scene, the subject vehicle A is scheduled to pass through the pedestrian crossing and enter the road ahead. Multiple supports are placed along both sides of a sidewalk connecting to the pedestrian crossing. With these supports, the pedestrian P as a moving object walking on the sidewalk is located in the blind spot area for the subject vehicle A. The roadway that the subject vehicle A is scheduled to enter is also a blind spot area due to the supports. In this area, each of two roadside cameras RC has an imaging range including the sidewalk and the roadway. It is assumed that the subject vehicle A temporarily stops in front of the pedestrian crossing. It is assumed that the pedestrian P is far enough away from the pedestrian crossing to allow the subject vehicle A to start.

In this scene, the blind spot area prediction unit 120 acquires the detection information of the pedestrian P by the roadside camera RC. The blind spot area prediction unit 120 predicts behavior of the pedestrian P based on the detection information. Specifically, the blind spot area prediction unit 120 predicts whether or not the pedestrian P is approaching the pedestrian crossing and the arrival time for the pedestrian P to arrive at the pedestrian crossing.

The behavior planning unit 140 generates an behavior plan for the subject vehicle A according to the behavior of the pedestrian P based on the above behavior prediction result. For example, when the pedestrian P is not approaching the pedestrian crossing, or when the pedestrian P is approaching the pedestrian crossing and the arrival time at the pedestrian crossing exceeds a predetermined time, the behavior planning unit 140 plans a low speed behavior for the subject vehicle to reduce the travelling speed. On the other hand, when the pedestrian P is approaching the pedestrian crossing and the arrival time at the pedestrian crossing is less than the predetermined time, the behavior planning unit 140 plans a slowest speed behavior for the subject vehicle A under which the travelling speed is further reduced than the above-mentioned slow speed behavior.

When entering the roadway after passing the pedestrian crossing, the behavior planning unit 140 plans a pause behavior when the other vehicle is predicted to approach the subject vehicle A based on the detection information of the roadside camera RC, as shown in FIG. 9, whereas the behavior planning unit 140 plans a turning right behavior for the subject vehicle A to turn right when the other vehicle is not predicted to approach the subject vehicle.

Figure 12:
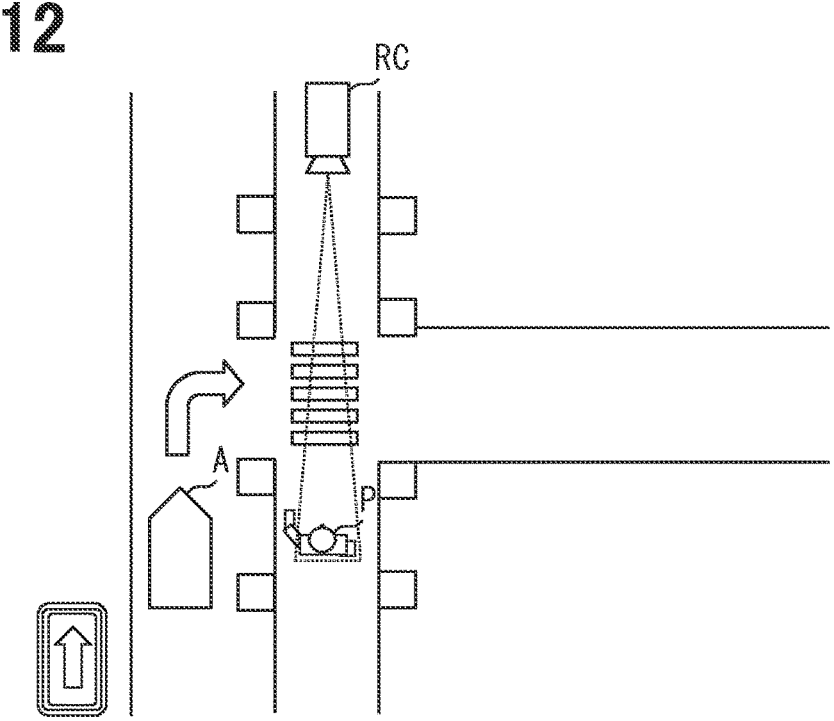
FIG. 12 is a diagram illustrating an example of behavior prediction of the moving object based on blind spot moving object information.

FIG. 12 shows a turning-right passing scene where the subject vehicle A turns right and then passes through a pedestrian crossing. In this scene, it is assumed that the situation is the same as in FIG. 11 except the traveling position of the subject vehicle A.

In this scene, the blind spot area prediction unit 120 predicts the behavior of the pedestrian P in the blind spot area of the subject vehicle A based on the information from the roadside camera RC. When the pedestrian P is predicted to approach the pedestrian crossing, the behavior planning unit 140 plans a pause behavior for the subject vehicle A to wait until the pedestrian P passes the pedestrian crossing. Here, the pause behavior is not planned as a behavior while the subject vehicle A is turning right, but planned as a behavior before turning right. As a result, the behavior planning unit 140 avoids a situation where the subject vehicle A pauses at a position very close to the pedestrian crossing, which reduces the psychological pressure to the pedestrian P caused by the subject vehicle A.

Figure 13:
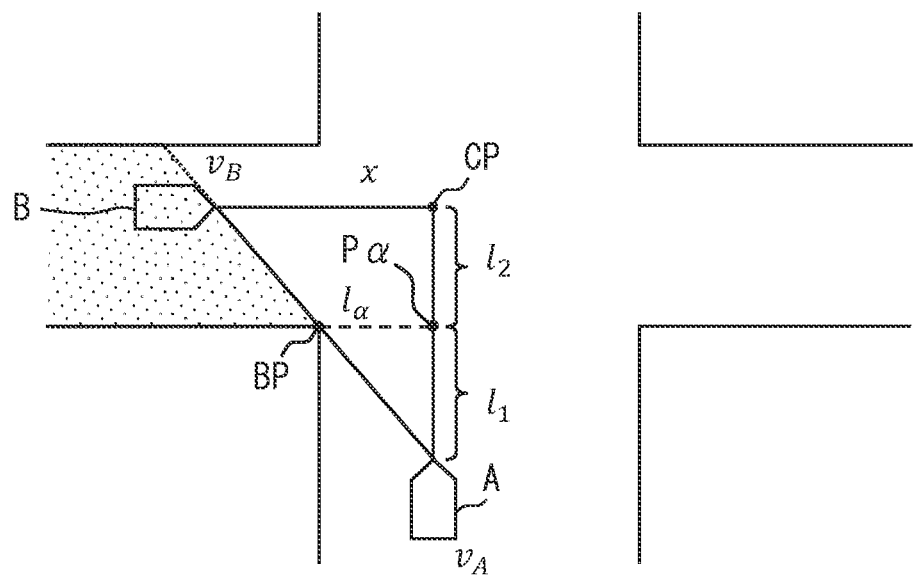
FIG. 13 is a diagram illustrating an example of existence prediction of an undetected moving object.

FIG. 13 shows an intersection passing scene in which the vehicle travels straight passing the intersection. In this scene, it is assumed that a part of the intersection is a blind spot area for the subject vehicle A. Unlike the scenes described so far, there is no roadside camera or the like that detects moving objects in the blind spot area in the present scene. In other words, the blind spot area prediction unit 120 cannot determine whether or not a moving object exists in the blind spot area. It is assumed that the subject vehicle A is travelling straight ahead to the intersection.

In this scene, the blind spot area prediction unit 120 determines the possibility of existence of an undetected moving object based on the vehicle position information and the terrain information. Specifically, the blind spot area prediction unit 120 may determine existence of an undetected moving object when the blind spot area for the subject vehicle A is on the surrounding road and the blind spot moving object information in the blind spot area does not exist.

When it is determined that the undetected moving object is likely to exist, the behavior planning unit 140 assumes that another virtual vehicle (hereinafter referred to as the other virtual vehicle) travels in the blind spot area, and plans a low speed behavior for the subject vehicle A assuming the other virtual vehicle is travelling to the intersection of the other virtual vehicle. The behavior planning unit 140 sets a speed condition regarding an upper limit to the traveling speed of the subject vehicle A when planning the low speed behavior. The behavior planning unit 140 sets the speed condition such that the subject vehicle A can stop without colliding with another vehicle if the other vehicle actually appears from the blind spot area.

The method of setting the speed condition will be described below. The behavior planning unit 140 sets an intersection point CP between the future trajectory of the subject vehicle A and an assumed trajectory of the other virtual vehicle. It is assumed that the future trajectory and the assumed trajectory each have a shape (straight line as shown FIG. 13) along the traveling road. Here, a distance x refers to the distance from the position of the other virtual vehicle to the intersection point CP. The distance x may also be considered as a recognition range of crossing lanes for the subject vehicle A from the intersection CP as a reference point. L$\alpha$ is a distance between a boundary point BP, which is the closest point to the subject vehicle A on a boundary of the blind spot area, and a closest point P$\alpha$ on the future trajectory with respect to the boundary point BP. The distance from the vehicle to the closest point P$\alpha$ is $l_1$, and the distance from the closest point P$\alpha$ to the intersection point CP is $l_2$. Assuming that the speed of the subject vehicle A at the current position is $v_A$, the time for the other virtual vehicle to reach the intersection CP is $t_c$, and the maximum deceleration allowed for the subject vehicle A is $a_A$, the condition required for the subject vehicle A to stop before the intersection point CP without reaching the intersection point CP is expressed by the following [Equation 1].

$$l_1 + l_2 > v_A t_c - \frac{1}{2} a_A t_c^2 \qquad \text{[Equation 1]}$$

Assuming that the assumed speed of the other virtual vehicle is $v_B$, the speed condition of the subject vehicle A is expressed by the [Equation 3], based on the relationship expressed by the [Equation 1] and [Equation 2].

$$t_c = \frac{x}{v_B} \qquad \text{[Equation 2]}$$

$$\dot{e}_i + a e_i = 0 \qquad \text{[Equation 3]}$$

Here, the distance x is determined by the similarity ratio between a triangle defined by the position of the subject vehicle, the position of the other virtual vehicle, and the intersection point CP, and a triangle defined by the position of the subject vehicle, the boundary point BP, and the closest point P$\alpha$, as expressed by the following [Equation 4].

$$x = \left(1 + \frac{l_2}{l_1}\right) l_a \qquad \text{[Equation 4]}$$

Based on the [Equation 3] and [Equation 4], the speed condition is expressed by the following [Equation 5].

$$v_A < \frac{l_1}{l_a} v_B + \frac{a_A}{2 v_B}\left(1 + \frac{l_2}{l_1}\right) l_a \qquad \text{[Equation 5]}$$

The behavior planning unit 140 sets the above speed condition when planning the low speed behavior. The assumed speed $v_B$ of the other virtual vehicle may be determined based on the speed limit of the lane in which the other virtual vehicle is expected to travel. The maximum deceleration Aa allowed for the subject vehicle A may be a pre-determined value (for example, about 0.3 G). The trajectory planning unit 150 generates a trajectory plan including a speed change of the subject vehicle A based on the speed condition.

The description below explains advantageous effects provided by the first embodiment.

The first embodiment predicts the with-vehicle interaction, which is the behavior of the moving object according to the state of the subject vehicle A, with respect to the moving object around the subject vehicle A. The with-environment interaction, which is the behavior of the moving object according to the surrounding environment of the moving object with respect to the moving object in the outer area, which is an area outside the inner area, is predicted. Then, the future behavior of the subject vehicle A is planned based on the with-environment interaction, and at least one of the future trajectory and the future speed of the subject vehicle A is planned based on the with-vehicle interaction. Therefore, prediction of behavior and use of result of the prediction can be carried out for a moving object which is closer to the subject vehicle A and more affected by the subject vehicle A and for a moving object which is relatively away from the subject vehicle A and thus is less affected by the subject vehicle A. As such, it is possible to predict the behavior of the moving object and use the prediction result according to the situation.

In the first embodiment, the behavior of the moving object is predicted based on the blind spot moving object information regarding the moving object in the blind spot area for the subject vehicle A, and the future behavior is planned based on the predicted behavior of the moving object. Therefore, the future behavior can be taken in consideration of the behavior prediction of the moving object in the blind spot area for the subject vehicle A. In this regard, travel assistance in response to different situation can be implemented more appropriately.

According to the first embodiment, the presence or absence of the undetected moving object is determined, and when it is determined that the undetected moving object exists, the future behavior is planned considering the behavior of the undetected moving object. Therefore, it is possible to provide travel assistance for the subject vehicle A considering the behavior of the undetected moving object. In this regard, even if the undetected moving object actually exists, the subject vehicle A can still travel in response to such situation.

Other Embodiments

The disclosure in the present specification is not limited to the above-described embodiments. The present disclosure includes embodiments described above and modifications of the above-described embodiments made by a person skilled in the art. For example, the present disclosure is not limited to a combination of the components and/or elements described in the embodiments. The present disclosure may be executed by various different combinations. The present disclosure may include additional configuration that can be added to the above-described embodiments. The present disclosure also includes modifications which include partial components/elements of the above-described embodiments. The present disclosure includes replacements of components and/or elements between one embodiment and another embodiment, or combinations of components and/or elements between one embodiment and another embodiment The disclosed technical scope is not limited to the description of the embodiment. Several technical scopes disclosed are indicated by descriptions in the claims and should be understood to include all modifications within the meaning and scope equivalent to the descriptions in the claims.

Although in the above-described embodiment, the inner area prediction is executed after execution of the outer area prediction, the inner area prediction may be executed before or in parallel with the execution of the outer area prediction. Either of the outer area planning process and the inner area planning process may be executed first, or they may be executed in parallel, as long as the corresponding prediction process is executed.

In the above-described embodiment, although the outer area prediction unit 110 predicts the with-environment interaction according to the state of the traffic light, the occurrence of traffic jams, construction, accidents, etc., and the behavior of the other moving object, some of the with-environment may not be predicted. Any with-environment interaction other than the above-mentioned with-environment interaction may be predicted.

In the above-described embodiment, the inner area prediction unit 130 predicts the with-vehicle interaction according to, for example, passing by the subject vehicle A on a narrow road, and interaction in response to changing lane of the subject vehicle A. However, some of the with-vehicle interactions may not be predicted. Any with-vehicle interaction other than the above-mentioned with-vehicle interaction may be predicted.

The travel assistance ECU 100 of the modification may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The travel assistance ECU 100 may be provided by a set of computer resources linked by a computer or a data communication device. For example, a part of the functions provided by the travel assistance ECU 100 in the above-described embodiments may be realized by another ECU.

The description in the above embodiments is adapted to the region where left-hand traffic is designated by law. In the region where right-hand traffic is designated by law, left and right are reversed.

What is claimed is:

1. A travel assistance device for assisting travel of a subject vehicle, the device comprising:
   a processor;
   a non-transitory computer-readable storage medium; and
   a set of computer-executable instructions stored on the non-transitory computer-readable storage medium that cause the processor to:
   predict a with-vehicle interaction that is a behavior taken, in response to a state of the subject vehicle, by a moving object within an inner area around the subject vehicle;
   predict a with-environment interaction that is a behavior taken by the moving object according to surrounding environment of the moving object within an outer area further from the subject vehicle than the inner area;
   plan a future behavior of the subject vehicle based on the predicted with-environment interaction, wherein the future behavior is a behavior pattern of the subject vehicle realized by traveling control; and
   plan a future trajectory of the subject vehicle based on the predicted with-vehicle interaction, wherein
   the future trajectory defines traveling positions of the subject vehicle in accordance with travelling of the subject vehicle following the planned future behavior of the subject vehicle based on the predicted with-environment interaction, and
   the travel of the subject vehicle is controlled to realize automatic driving according to the future trajectory.

2. The travel assistance device of claim 1, wherein the set of computer-executable instructions further cause the processor to:
   predict based on blind spot moving object information, a behavior of a moving object within a blind spot area that is outside of a detection range of an in-vehicle sensor mounted on the subject vehicle,
   wherein the future behavior is planned based on the behavior of the moving object that is predicted.

3. The travel assistance device according to claim 1, wherein the set of computer-executable instructions further cause the processor to:
   determine whether an undetected moving object exists, wherein
   the future behavior is planned in anticipation of the undetected moving body upon determining that the undetected moving object exists.

4. The travel assistance device according to claim 1, wherein the set of computer-executable instructions further cause the processor to:
   predict the with-environment interaction in accordance with a state of a traffic light in the outer area.

5. The travel assistance device according to claim 1, wherein the set of computer-executable instructions further cause the processor to:
   predict the with-environment interaction in accordance with a state of another moving object different from the moving object within the outer area.

6. The travel assistance device according to claim 1, wherein the set of computer-executable instructions further cause the processor to:
   predict the with-vehicle interaction based on a travelling direction of the moving object.

7. A travel assistance method executed by a processor to assist travelling of a subject vehicle, the method comprising the steps of:

predicting a with-vehicle interaction that is a behavior taken, in response to a state of the subject vehicle, by a moving object within an inner area around the subject vehicle;
predicting a with-environment interaction that is a behavior taken by the moving object according to surrounding environment of the moving object within an outer area further from the subject vehicle than the inner area;
planning a future behavior of the subject vehicle based on the predicted with-environment interaction, wherein the future behavior is a behavior pattern of the subject vehicle realized by traveling control; and
planning a future trajectory of the subject vehicle based on the predicted with-vehicle interaction, wherein
the future trajectory defines traveling positions of the subject vehicle in accordance with travelling of the subject vehicle following the planned future behavior of the subject vehicle based on the predicted with-environment interaction, and
the travel of the subject vehicle is controlled to realize automatic driving according to the future trajectory.

8. The travel assistance method according to claim 7, further comprising the step of
predicting, based on blind spot moving object information, a behavior of a moving object within a blind spot area that is outside of a detection range of an in-vehicle sensor mounted on the subject vehicle,
wherein the step of planning the future behavior includes planning the future behavior based on the predicted behavior of the moving object within the blind spot area.

9. The travel assistance method according to claim 7, further comprising the step of
determining whether an undetected moving object exists, wherein
the step of planning the future behavior includes planning the future behavior in anticipation of the undetected moving body upon determining that the undetected moving object exists.

10. The travel assistance method according to claim 7, wherein
the step of predicting the with-environment interaction includes predicting the with-environment interaction in accordance with a state of a traffic light in the outer area.

11. The travel assistance method according to claim 7, wherein
the step of predicting the with-environment interaction includes predicting the with-environment interaction in accordance with a state of another moving object different from the moving object within the outer area.

12. The travel assistance method according to claim 7, wherein
the step of predicting the with-vehicle interaction includes predicting the with-vehicle interaction based on a travelling direction of the moving object.

13. A non-transitory computer readable medium storing a travel assistance program to assist driving of a subject vehicle, the program comprising instructions, when executed by a processor, causing the processor to:

predict a with-vehicle interaction that is a behavior taken, in response to a state of the subject vehicle, by a moving object within an inner area around the subject vehicle;
predict a with-environment interaction that is a behavior taken by the moving object according to surrounding environment of the moving object within an outer area further from the subject vehicle than the inner area;
plan a future behavior of the subject vehicle based on the predicted with-environment interaction, wherein the future behavior is a behavior pattern of the subject vehicle realized by traveling control; and
plan a future trajectory of the subject vehicle based on the predicted with-vehicle interaction, wherein
the future trajectory defines traveling positions of the subject vehicle in accordance with travelling of the subject vehicle following the planned future behavior of the subject vehicle based on the predicted with-environment interaction, and
the travel of the subject vehicle is controlled to realize automatic driving according to the future trajectory.

14. The non-transitory computer readable medium according to claim 13, the instructions further causing the processor to
predict, based on blind spot moving object information, a behavior of a moving object within a blind spot area that is outside of an detectable area of an in-vehicle sensor mounted on the subject vehicle,
wherein when predicting the future behavior, the instructions cause the processor to plan the future behavior based on the behavior of the moving object predicted within the blind spot area.

15. The non-transitory computer readable medium according to claim 13, the instructions further causing the processor to
determine whether an undetected moving object exists, wherein
when planning the future behavior, the instructions cause the processor to plan the future behavior in anticipation of the undetected moving body upon determining that the undetected moving object exists.

16. The non-transitory computer readable medium according to claim 13, wherein
when predicting the with-environment interaction, the instructions cause the processor to predict the with-environment interaction in accordance with a state of a traffic light in the outer area.

17. The non-transitory computer readable medium according to claim 13, wherein
when predicting the with-environment interaction, the instructions cause the processor to predict the with-environment interaction in accordance with a state of another moving object different from the moving object within the outer area.

18. The non-transitory computer readable medium according to claim 13, wherein
when predicting the with-vehicle interaction, the instructions cause the processor to predict the with-vehicle interaction based on a travelling direction of the moving object.

* * * * *